US005828030A

United States Patent [19]

Naor

[11] Patent Number: 5,828,030

[45] Date of Patent: *Oct. 27, 1998

[54] METHOD AND APPARATUS FOR A CONTACT START PLASMA CUTTING PROCESS

[75] Inventor: Peter Naor, San Diego, Calif.

[73] Assignee: Illinois Tool Works Inc., Glenview, Ill.

[ * ] Notice: The term of this patent shall not extend beyond the expiration date of Pat. No. 5,660,745.

[21] Appl. No.: 911,905

[22] Filed: Aug. 15, 1997

Related U.S. Application Data

[63] Continuation of Ser. No. 573,380, Dec. 15, 1995, Pat. No. 5,660,745.

[51] Int. Cl.[6] ...... B23K 10/00

[52] U.S. Cl. ...... 219/121.57; 219/121.39; 219/121.55; 219/121.51; 219/121.57

[58] Field of Search ...... 219/121.54, 121.57, 219/121.39, 121.44, 121.59, 121.51, 121.55, 74, 75

[56] References Cited

U.S. PATENT DOCUMENTS

| | | | |
|---|---|---|---|
| 3,641,308 | 2/1972 | Couch, Jr. et al. | 219/75 |
| 4,780,591 | 10/1988 | Bernecki et al. | 219/121.52 |
| 4,791,268 | 12/1988 | Sanders et al. | 219/121.57 |
| 4,902,871 | 2/1990 | Sanders et al. | 219/121.49 |
| 5,070,227 | 12/1991 | Luo et al. | 219/121.55 |
| 5,506,384 | 4/1996 | Yamaguchi | 219/121.57 |

*Primary Examiner*—Mark H. Paschall
*Attorney, Agent, or Firm*—George R. Corrigan

[57] ABSTRACT

An plasma cutter, including a power supply, a cutting torch (with a nozzle), a source of air and a valve, is disclosed. The cutting torch is connected to the two power source outputs (cathode and anode). Air is supplied to the nozzle through the valve from the air supply. In one position the valve allows air to flow from the air source to the nozzle. In a second position the valve prevents air from flowing from the air supply to the nozzle and also vents the nozzle and torch. The torch has a movable electrode and the nozzle is in a fixed position. The nozzle and electrode are each electrically connected to a different one of the power outputs. The electrode is biased (preferably by a spring) to be in contact with the nozzle. However, air flowing into the torch and electrode overcomes the bias and moves the electrode away from the nozzle. If the arc is absent and the user desires current, then the valve is moved to prevent air from flowing into the torch and to vent the torch. Also, the valve is moved to provide air flow (thus purging the torch) when the power supply is powered up.

10 Claims, 9 Drawing Sheets

METHOD AND APPARATUS FOR A CONTACT START PLASMA CUTTING PROCESS

This application is a continuation of Ser. No. 08/573,380 filed Dec. 15, 1995 now U.S. Pat. No. 5,660,745.

BACKGROUND OF THE INVENTION

The present invention is generally directed to the plasma cutting and more particularly directed toward a method and apparatus used in a contact start plasma cutting process.

There are several known methods of initiating a plasma arc discharge and starting an arc plasma torch (for plasma cutting). The better known include: high frequency or high voltage discharge, contact starting, and with an exploding wire. In each method an arc is drawn between a cathode and an anode, and an ionizable gas is directed to flow around the arc, creating a plasma jet.

The high frequency discharge or high voltage spark discharge method of initiating a plasma arc is relatively old and at one time widely used. The method entails using a high voltage to break down the gap between a cathode and an anode, thus generating charge carriers which create the electric current path necessary to start the arc. Such a method is disclosed in U.S. Pat. No. 3,641,308, to R. Couch, Jr., et al. As disclosed by R. Couch, et al. a brief high voltage pulse provided to the cathode initiates an arc discharge across the gap from the cathode to a grounded workpiece.

However, the high frequency method of arc starting can produce electromagnetic interference in nearby electronic equipment, thus requiring either shielding or a remote location of the high frequency electronics. Furthermore, the equipment required to generate the high frequency discharge may be expensive.

An electrical conductor is extended from the cathode to the workpiece in the "exploding wire" technique. The conductor vaporizes when the current is initiated, leaving the arc in its place. Obviously, the exploding wire technique cannot practically be used in start and stop type plasma cutting processes.

Contact starting of plasma arcs entails touching an anode and a cathode, thus requiring relatively little current and voltage, and eliminating the need for high frequency equipment (along with the associated high cost and electromagnetic interference) The cathode is manually placed into electrical connection with the workpiece in older methods of contact starting and a current is passed from the cathode to the workpiece. The arc is struck by manually backing the cathode away from the workpiece. Often, the cathode is the electrode and the nozzle through which the plasma jet passes serves as an electrical conductor connecting the electrode with the workpiece. The nozzle slides with respect to the electrode, and is forced into contact with the electrode when it is pressed against the workpiece. Thus, the electrode, nozzle, and workpiece function electrically in series when the current flow is initiated. When the electrode is manually backed away from the workpiece, the nozzle is allowed to separate from the electrode and return to its normal position.

One disadvantage of such contact starting systems is that when the nozzle is pressed against the workpiece there is a risk of damaging a brittle ceramic element usually located at the end of the nozzle. Also, it is difficult in practice to initiate a cut while at the same time attempting to press the nozzle down onto a workpiece. Another problem with this starting method is that nonconductive coatings such as paint make electrical contact starting using the workpiece difficult. As a result, a pilot arc circuit may be required, even when contact starting is available.

A more recent type of contact starting torch has a cathode and an anode in the torch that are initially touching. This contact is a path through which current flows. The cathode is then automatically moved and separated from the anode in response to a build up of gas pressure within the torch. The current flowing from the cathode to the anode before the separation creates a pilot arc across the gap as the cathode and the anode separate.

U.S. Pat. No. 4,791,268, to N. Sanders, et al., describes such a torch having a movable electrode acting as the cathode and a fixed nozzle acting as the anode. A spring forces the electrode contact with the nozzle when no gas is flowing within he torch. In this position the electrode blocks the nozzle orifice. After electrical current begins to flow from the electrode to the nozzle, gas is supplied to the torch. The gas exerts a force upon the piston part counteracting the force exerted by the spring, and, when high enough, the moves the electrode away from the nozzle. This breaks the electrical contact between the electrode and the nozzle and creates the pilot arc. Also, as the electrode moves away from the nozzle, it opens the nozzle orifice, and a plasma jet is provided by the torch.

A torch commercially available today from Hypertherm, Inc., Hanover, N.H. is a contact start torch. The torch has an internal contact mechanism with an electrode to tip shorting position and an open position. The electrode is spring loaded into the shorting position, and may be moved to an open position by means of force applied with compressed air. This contact mechanism provides a reliable pilot current path when shorting and when the contact moves to the open position an arc is created. There is a predetermined travel distance between the shorting and open positions.

The cutting process is initiated with a pilot arc between the tip and electrode An inductor located in the pilot current path stores inductive energy due to the pilot current. The short is forcibly opened by an applied air flow. When the short is opened, the inductor causes a discharge through the opening gap between the electrode and tip. The energy discharged ionizes the air in the gap, lowering gap resistance, thus providing a path for continuation of pilot current flow (now an arc).

Cutting of metal is initiated by transferring a portion of the pilot arc current from the electrode, through the metal being cut, to the positive polarity terminal of the power source. Electronics in the power source sense when the arc has transferred and then supply a greater magnitude main cutting current after the transfer has occurred. Also, the torch tip is disconnected (electrically) interrupting the pilot current path. Thus, the current is used to cut the workpiece, and follows a path including the positive terminal, the workpiece, and the electrode.

However, this type of torch has a significant drawback: if the arc is extinguished (or does not transfer) the process can only be reinitiated by releasing and retriggering (recycling) a trigger switch on the torch. This disadvantage is of particular importance when cutting an expanded metal (such as a grille), which necessarily involves extinguishing of the arc. Moreover, the cutting arc cannot be reignited until the air pressure built up in the hose leading to the torch is dissipated. This takes some time in the prior art systems, which do not provide a mechanism to vent the hose. Accordingly, a torch and power supply that allows arc reignition without recycling the trigger is desired.

One potential danger of plasma cutting systems is the possibly lethal voltage levels associated with this process.

Generally, plasma cutting systems provide safety provisions such as a parts in place (PIP) circuit that will inhibit power source operation and prevent application of a high OCV if any part is missing. This technology does not provide a redundant safety system. Accordingly, it is desirable to provide a redundant safety system that prevents dangerously high open circuit voltages, even if the PIP system is defeated and the torch engaged.

Another shortcoming of known torch and plasma cutting systems is that the torch and consumable parts in the torch can get very hot during operation. Moreover, when the arc is extinguished, the heat is typically not dissipated, thereby shortening parts life and possibly damaging the torch. Accordingly, a torch that provides postarc cooling is desired. However, the cooling should not interfere with reignition of the arc.

SUMMARY OF THE PRESENT INVENTION

According to one aspect of the invention an apparatus for plasma cutting includes a power supply, a cutting torch, a source of air and a valve. The power source provides two outputs (cathode and anode) and the torch is electrically connected to the power outputs. Also, the torch has a nozzle. Air is supplied to the torch (and nozzle) through the valve from the air supply. In one position the valve allows air to flow from the air source to the nozzle. In a second position the valve prevents air from flowing from the air supply to the nozzle and also vents the nozzle and torch.

In one embodiment the torch has a movable electrode and the nozzle is in a fixed position. The nozzle and electrode are each electrically connected to a different one of the power outputs. The electrode is biased (preferably by a spring) to be in contact with the nozzle. However, air flowing into the torch and electrode overcomes the bias and moves the electrode away from the nozzle.

In another embodiment the torch includes a trigger switch that indicates whether or not the user desires current to flow. The power source senses when the arc is absent, and if the arc is absent and the user desires current, the valve is moved to prevent air from flowing into the torch and to vent the torch.

In yet another embodiment the power supply detects the absence of current flowing in the electrode, and reduces the output voltage in the event the absence of output current is detected.

In a different embodiment the valve is moved to provide air flow (thus purging the torch) when the power supply is powered up.

Other principal features and advantages of the invention will become apparent to those skilled in the art upon review of the following drawings, the detailed description, and the appended claims.

Figure 1:
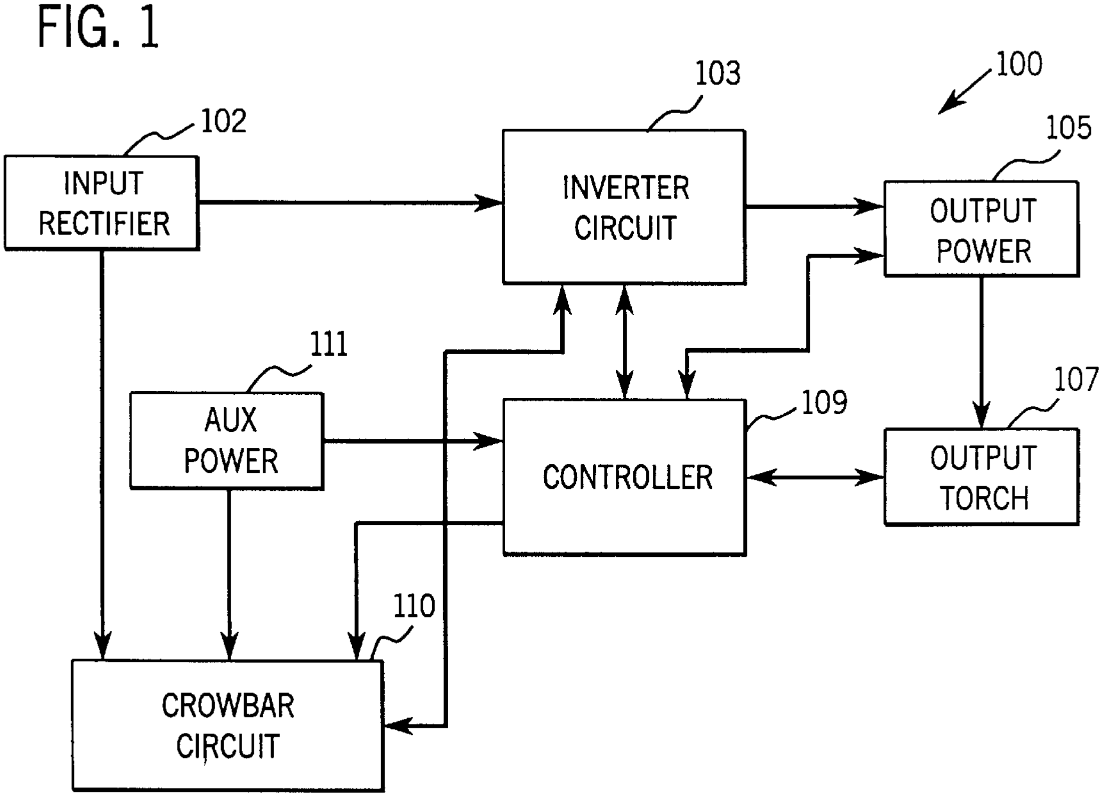
FIG. 1 is a block diagram of a plasma cutting system constructed in accordance with the present invention.

Before explaining at least one embodiment of the invention in detail, it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF A PREFERRED EXEMPLARY EMBODIMENT

The present invention is directed toward a plasma cutting system. The invention provides a torch and power source for plasma cutting that automatically reignites the cutting arc (and pilot current), and is thus easier to use and suitable for cutting expanded metal. In one embodiment air flow is provided postarc (called a postflow) to cool the torch. In another embodiment a safety system provides a low open circuit voltage.

Referring now to FIG. 1, a plasma cutting system 100, constructed in accordance with the present invention, is shown in block form. An input rectifier circuit 102 receives incoming ac power and rectifies that power in a manner well known in the art. Input rectifier 102 may filter the input power and suppress spikes as is also well known in the art. The output of input rectifier 102 is thus an internal dc buss, which is provided to an inverter circuit 103 (each line connecting any of the various components of FIG. 1 may represent one or more electrical or mechanical connections).

Inverter circuit 103 will be described in more detail below, but also is of standard configuration. Inverter circuit 103 includes a series resonant inverter that receives dc input power ( from input rectifier 102) and provides an ac signal having a power magnitude responsive to the frequency of switching of the inverter. Additionally, inverter circuit 103 will typically include circuitry to perform additional functions, such as a soft charge circuit, a voltage changeover circuit, and surge resistors.

The output of inverter circuit 103 is provided to an output power circuit 105, which will be described in greater detail below. Output power circuit 105 receives the inverted signal, and in a well known manner transforms, rectifies and filters the signal to provide a dc output signal.

The dc output power is provided to an output torch system 107, which includes the torch, electrode and workpiece, and is described below in more detail. The torch is preferably (but not necessarily) of the type described in U.S. Pat. Nos. 4,791,268 and 4,902,871, both incorporated herein by reference, and includes a spring biased electrode which is normally in contact with the tip (i.e. the shorting position). In this type of torch, air flow (from an air supply 108) can force the electrode away from the tip, into the open position. Air supply 108 may be compressed air, or other appropriate cutting gas, and typically is filtered and pressure regulated.

Initially a pilot current path exists from the electrode to the tip of the torch (nozzle). When air flow forces the electrode away from the tip, the short opens and inductive energy stored in the current path discharges, ionizing the air in the gap, creating an arc.

A controller 109 provides the signals necessary to control the circuits represented on FIG. 1, in response to feedback signals received. The control signals include the inverter switching signals and relay closing/opening signals. Controller 109 will also be described in greater detail below.

As will be described in greater detail below, and unlike the prior art, a three way air solenoid (or valve) is activated when the cutting current is interrupted. The three way solenoid vents the air path to the torch, allowing faster reclosure of the electrode to tip contact mechanism. Also, logic on the main control board (described below) permits the operator to continuously cut by merely holding the torch trigger switch engaged. Briefly, when an arc outage is sensed, the air solenoid interrupts air supply and vents the torch, and the nozzle is electrically connected into the output circuit, thus nearly instantaneously closing a pilot current path and reinitiating a pilot arc.

A crowbar circuit 110 is connected to the input rectifier and inverter circuit. Crowbar circuit 110 protects the power train in the event of ac line misapplication. Also, crowbar circuit 110 provides power to an auxiliary power circuit 111, which provides power for logic (in controller 109), the fan and other auxiliary components.

Figure 2:
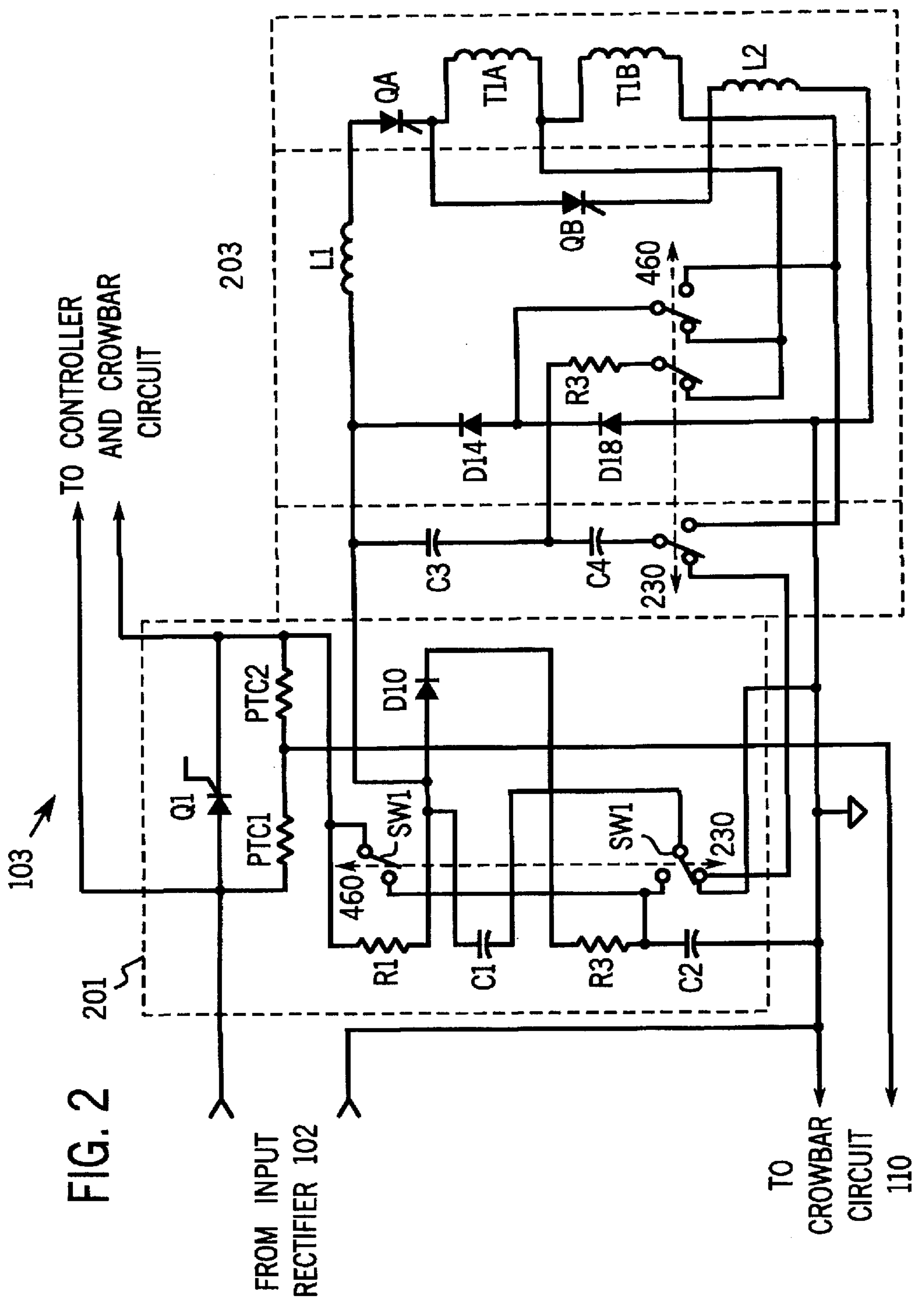
FIG. 2 is a circuit diagram showing the inverter circuit of FIG. 1.

Referring now to FIG. 2, inverter circuit 103 is shown in more detail and includes a soft charge circuit 201. Soft charge circuit 201 includes a pair of dc buss hold up capacitors C1 and C2, which soft charge on power up via a pair of resistors PTC1 and PTC2. The voltage across resistors PCT1 and PCT2 is monitored by controller 109, which turns on a bypass SCR Q1 only after a successful soft charge cycle, signaled by the voltage across resistors PTC1 and PTC2 dropping below a threshold. Additionally, the voltage across resistors PCT1 and PCT2 is monitored by crowbar circuit 110.

A pair of resistors R1 and R2 are provided to protect from surges. Specifically, surge resistors R1 and R2 provide a minimum resistance that limits the current when the inverter switches malfunction and/or cross conduct. The combination of resistors R1/R2 trip time limits for the input diodes in input rectifier 102 and bypass SCR Q1.

Inverter circuit 103 also includes a series resonant inverter comprised of a pair of capacitors C3 and C4 (which often are, in practice, banks of capacitors), an over voltage protection circuit including diodes D1A, D1B, resistor R3, and a pair of inductors L1, L2, a pair of switches QA and QB (SCR's in the preferred embodiment) and a pair of primary transformer windings T1A and T1B. Power is transferred to the secondary by means of alternately triggering SCR's QA and QB. As is well known in the art, the amount of power that is transferred is proportional to the frequency of SCR's QA and QB conduction. The switching of SCR's QA and QB is controlled by controller 109.

Plasma cutting system 100 is designed for dual ac line voltages, such as 230 or 460V ac in the preferred embodiment. A switch SW1 connects soft charge capacitors C1 and C2, surge resistors R1 and R2, and capacitors C3 and C4, diodes D1A, D2A, resistor R3, and transformer windings T1A and T1B for the appropriate line voltage.

Crowbar circuit 110 (FIG. 1) monitors the voltage across input capacitors C1 and C2. When that voltage exceeds a predetermined level, crowbar circuit 110 crowbars the common junction of resistors PTC1 to PTC2, thus terminating the soft charge cycle and discharging capacitors C1 and C2. In a crowbar condition controller 109 prevents bypass SCR Q1 from turning on until the voltage across resistors PTC1 and PTC2 drops to a normal level at the end of a normal soft charge cycle. Additionally, crowbar circuit 110 prevents damage to auxiliary power circuit 111, should the input line be improperly selected.

Figure 3:
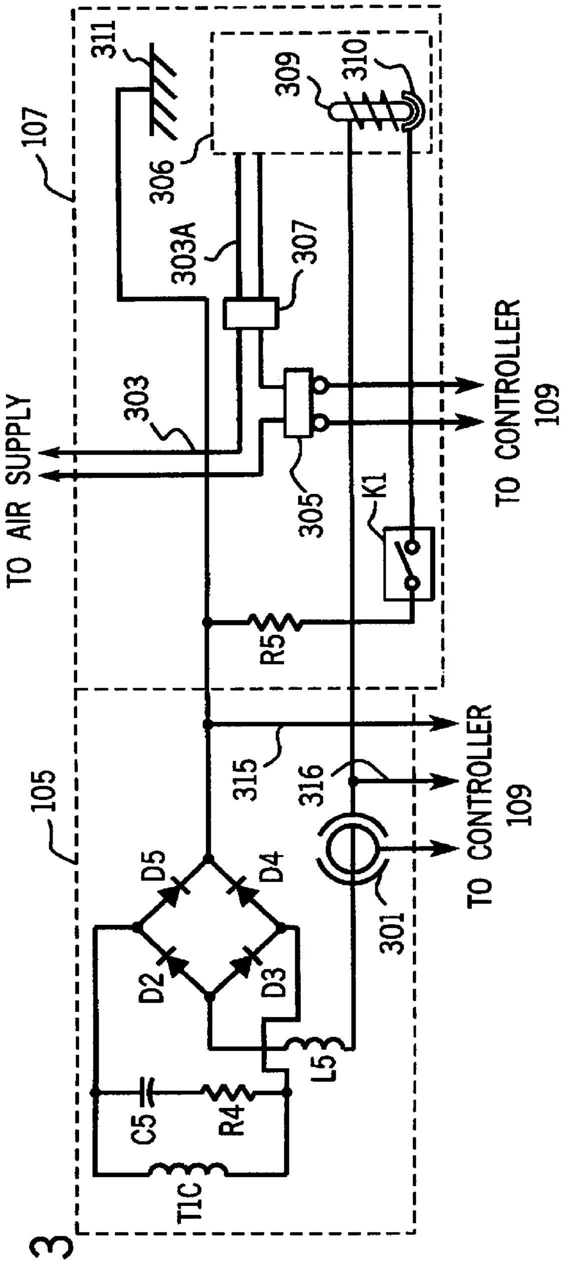
FIG. 3 is a schematic diagram of the output power circuit of FIG. 1 and the output torch of FIG. 1.

Output power circuit 105 is shown in detail on FIG. 3, and includes a secondary winding T1C (magnetically coupled to primaries T1A and T1B), and a full wave rectifier including diodes D2–D5. Diodes D2–D5 may be protected from excessive reverse blocking voltage by a combination of a dissipative resistor and by the preventing of conduction of SCR's QA and QB until capacitors C3 and C4 voltage is dissipated to a predetermined level by resistor R3. The diodes junction-charge reverse recovery is provided by a snubber comprised of resistor R4 and capacitor C4.

Output torch system 107 includes a torch, shown in block form as 306, the output terminals and the connections thereto. A workpiece 311 is the grounded output and connected to diodes D4 and D5. Torch 306 is preferably of the type disclosed in U.S. Pat. No. 4,791,268 (although many designs are suitable) and includes a spring loaded electrode 309 connected to diodes D2 and D3 through an output inductor L5. Inductor L5 provides the inductive energy to create the pilot arc, as well as maintain a stable current when cutting (or in the pilot mode). The current to electrode 309 is monitored by a hall device 301 (or other suitable current feedback device such as a shunt, for example), and is provided to controller 109. A pressure sensor 305 provides a pressure feedback signal to controller 109.

Torch 306 includes a torch tip 310 (also called a nozzle) connected to diodes D4 and D5 which connects through a pilot relay K1 and a pilot resistor R5. Thus, when relay K1 is closed, torch tip 310 is connected to the positive dc output.

A hose 303 connects torch 306 to air supply 108, and includes a three way air solenoid 307. Three way air solenoid 307 (which may also be part of torch 306) provides quick venting of hose 303 and torch 306 when the arc is extinguished, thus allowing for prompt reignition of the arc.

As stated above, torch 306 may be of the type known in the art and, there is a short between electrode 309 and tip 310 in the spring loaded position. Tip 309 and electrode 310 separate when three way air solenoid 307 provides an air path from air supply 108 to torch 306. The mechanism by which the two separate is not important for this invention, but the pilot arc is preferably automatically created. Torch 306 preferably includes a torch trigger switch and a safety switch called parts in place (PIP) switch. The PIP switch, located within the torch head and mechanically linked to the torch cup, detects when an operator has removed the cup when consumable parts are being replaced. Upon receiving a PIP OPEN signal, controller 109 sets appropriate safety measures such as inhibit signals and prevents hazardous output voltages from being present.

At start up relay K1 is closed, creating a pilot current path from the positive dc output (diodes D4 and D5) through resistor R5 and relay K1 to electrode 309. Because the electrode is spring biased in the shorting position, current flows from tip 310 to electrode 309. When three way solenoid 307 closes and allows air to flow to torch 309, electrode 309 begins to separate from tip 310 and inductive energy stored in inductor L5 discharges through opening gap. As stated above, the energy discharged ionizes the air in the gap, lowering the resistance of the gap, and provides a path for continuation of pilot current flow.

Plasma cutting of metal workpiece 311 is initiated when a portion of the pilot arc current transfers from electrode 309 to workpiece 311 (as in the prior art). When this occurs controller 109 senses an arc transfer and causes inverter circuit 103 to provide a cutting current (that has a higher magnitude than the pilot current). Also, controller 109 opens relay K1, disconnecting tip 310 and interrupting the pilot current path.

Three way air solenoid 307, (which vents hose 303 and torch 306 and allows fast reclosure of the electrode 309 to tip 310) combines with control logic (described below) to permit the operator to continuously cut by merely holding the torch trigger switch engaged. When an arc outage is sensed (and the trigger remains pulled), air solenoid 307 interrupts the air supply and vents the torch. Also, controller 109, anticipates a main cutting arc outage and quickly closes relay K1 recreating the pilot current path that will maintain an arc in the torch with no need to reinitiate by recycling the trigger switch. The arc outage is anticipated by the arc voltage, as provided as feedback to controller 109 on lines 315 and 316, exceeding a predetermined voltage level. Other suitable feedback signals, such as current or power may be used.

Additionally, if the arc does not transfer when the torch trigger switch is engaged, controller 109 causes air solenoid 307 to interrupt the air supply and vent the torch. Thus, a pilot current path is quickly reestablished, and a pilot arc is reinitiated.

However, when the user wants to stop cutting - as signaled by the release of the trigger, air solenoid 307 does not immediately vent hose 303 and torch 306. Rather, controller 109 recognizes that this means the user has finished cutting, and causes air solenoid 307 to remain engaged momentarily. Thus, air continues to flow through hose 303 to torch 306, thereby cooling torch 306. After a short period of time air solenoid 307 closes. However, if at any time the trigger is reactivated by the user, then the postflow cycle (i.e., the air that flows after the arc has been extinguished and/or the user releases the trigger) is interrupted and the initiation condition (shorting condition without air flow) is started. In another embodiment a preflow cycle (i.e., air flow prior to an arc) is provided at power up to automatically purge hose 303.

Controller 109 is shown schematically in FIGS. 4 through 8 and includes circuitry that sends the necessary control signals, and receives the desired feedback signal. Many of the functions controller 109 provides are old in the art, and will be briefly described. Additionally, the specific circuitry used is of little importance, other circuitry will perform equally well.

Figure 4:
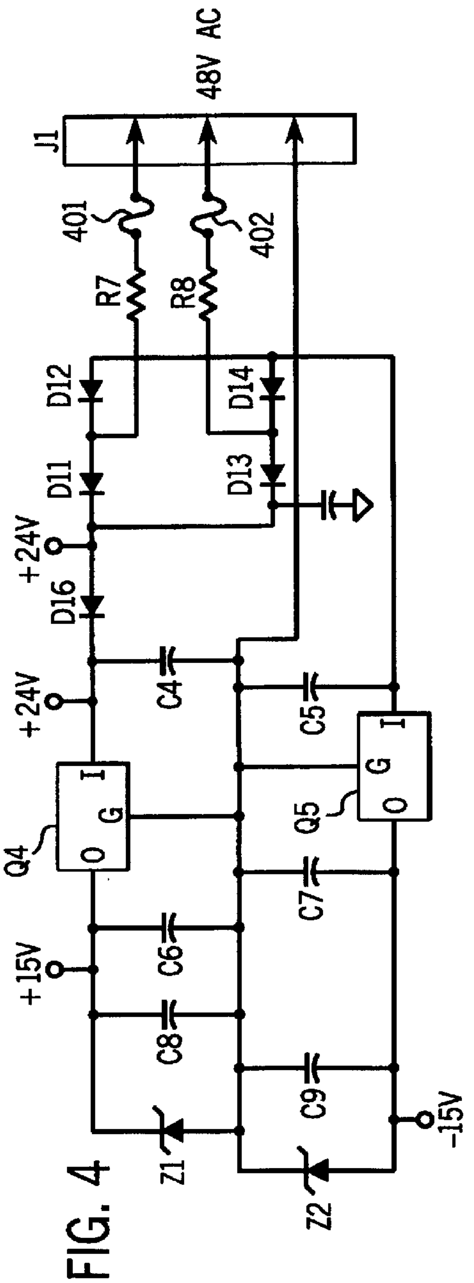
FIG. 4 is a schematic diagram of part of the controller of FIG. 1.

Referring now to FIG. 4, controller 109 receives, on a connector J1 a 48 volt ac signal from auxiliary power circuit 111. The 48 volt ac signal is rectified by a plurality of diodes Dll–D14 through a pair of resistors R7 and R8, and a pair of fuses 401 and 402. The rectified signal is filtered and regulated to produce logic and analog power requirements. The circuitry that accomplishes the filtering and regulation includes (in the preferred embodiment) a pair of 220 microF capacitors C4 and C5, a pair of 0.1 microF capacitors C6 and C7, a pair of 47 microF capacitors C8 and C9, a diode D16, a pair of zener diodes Z1 and Z2, and voltage regulators Q4 and Q5.

Figure 5:
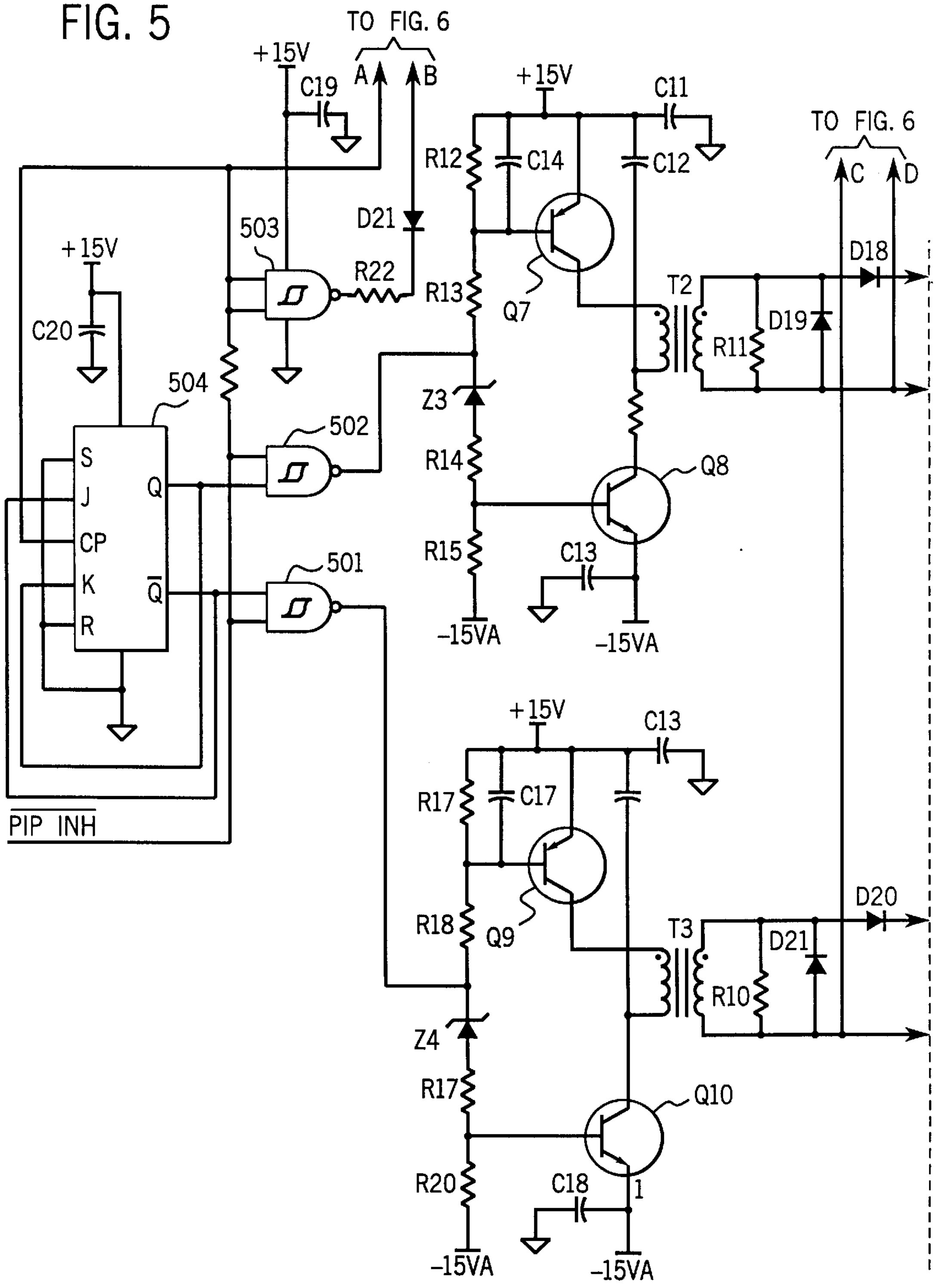
FIG. 5 is a schematic diagram of part of the controller of FIG. 1.

The circuitry used to generate the trigger pulse signals for SCR's QA and QB (of inverter circuit 103) is shown in FIG. 5 and is of the type found in the art. It includes a pair of pulse transformers T2 and T3, and associated logic and control signals (in a manner known in the art). The associated circuitry includes diodes D18–D21, a pair of 100 ohm resistors R10 and R11, a group of 10K ohm resistors R12–R15 and R17–R20, a pair of 470 ohm resistors R16 and R21, a pair of zener diodes Z3 and Z4, a plurality of switches Q7–Q1O, logic gates 501–503, a 10K ohm resistor R23, a 470 resistor R22, a diode D21, two 0.1 microF capacitors C19 and C20, and an IC504 (Part No. 4027).

Controller 109 may also include circuitry to protect SCR's QA and QB (FIG. 3). For example, in one embodiment, circuitry that prevents SCR QA from turning on before SCR QB has fully recovered, and vice versa. Another embodiment includes circuitry that protects output diodes D2–D5 (FIG. 3) from excessive reverse blocking voltage by inhibiting the trigger pulses for SCR's QA and QB until the voltage across capacitors C3 and C4 (FIG. 2) has dissipated to a predetermined level as measured with resistor R3 (FIG. 2). Controller 109 also includes circuitry used to inhibit pulses during a soft charge or crowbar condition. The circuitry used (in the preferred embodiment) to accomplish the controls described in this paragraph is shown on FIG. 6.

The circuitry that inhibits turn on of one of SCR's QA and QB until the other has recovered includes an opto-coupler Q11, and its associated circuitry. At the end of an SCR (QA or QB) conduction cycle, voltages higher than the ± internal dc bus level, i.e., blocking voltage is generated on capacitors C3 and C4 by inductor L5. The blocking voltage that is present turns on switch Q11. When switch Q11 is on, a pulse inhibit timer is activated, which inhibits the turn on pulse for a period of time, during which the previously conducting SCR fully recovers.

The circuitry that protects diodes D2–D5 from excessive reverse voltage includes an opto-coupler Q12, connected serially with switch Q11, and its associated circuitry. Switch Q12 will turn on only when excessive blocking voltage is present, and causes controller 109 to inhibit the trigger pulses for SCR's QA and QB until the voltage has dissipated to a safe, predetermined level.

Figure 6:
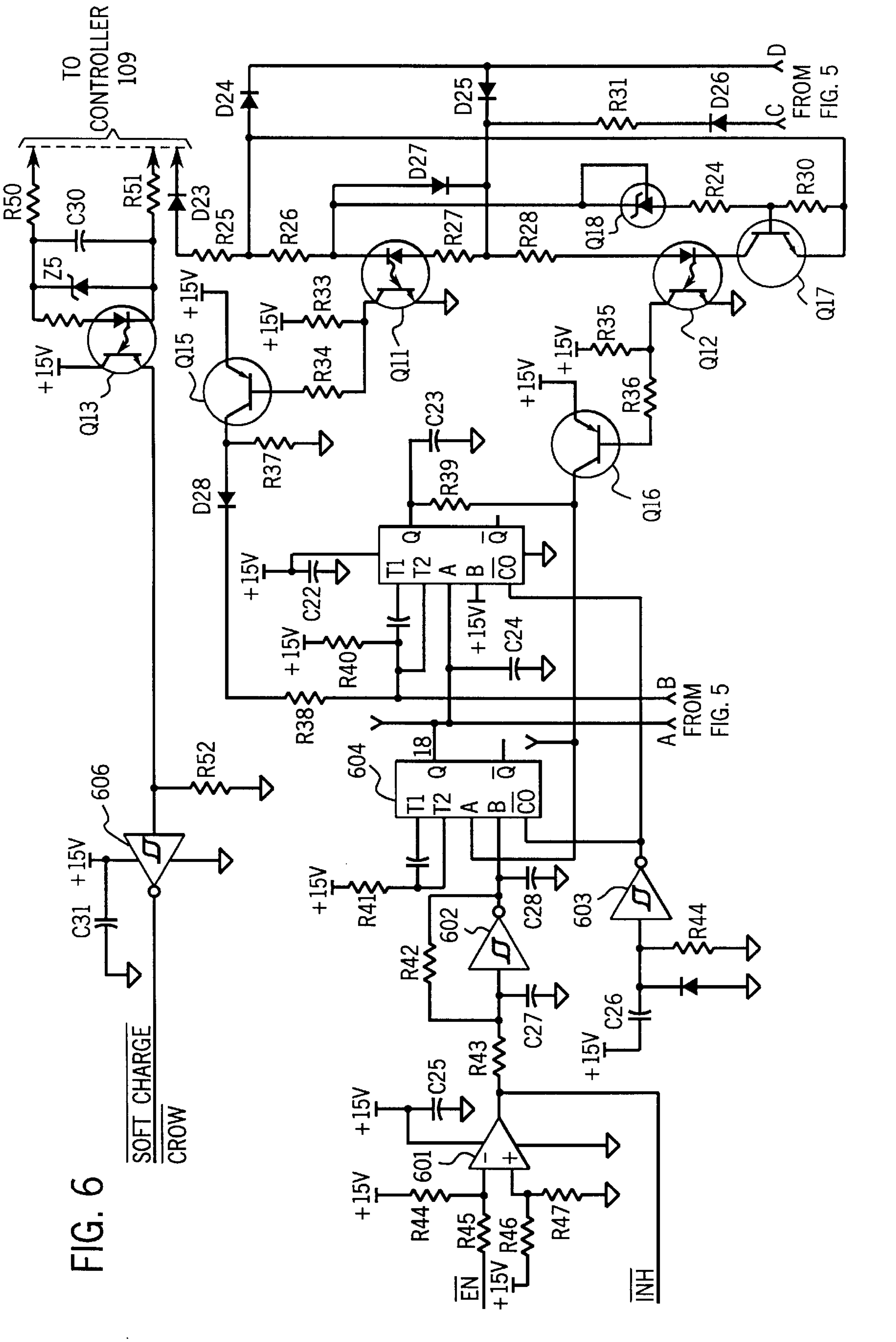
FIG. 6 is a schematic diagram of part of the controller of FIG. 1.

The associated circuitry for switches Q11 and Q12 is shown on FIG. 6 and includes: switches Q15, Q16, Q17 and Q18; diodes D24, D25, D26, D27, and D28; resistors R25, R29, R31 (4.7 K ohm) R26, R27, R33, R35 (470 ohm), R28, R34, R36, R43 (1 K ohm), R30, R39, R45, R47 (10 K ohm), R37, R38 (2.2 K ohm), R40 (560 K ohm), R41 (30.1 K ohm), R42 (22 K ohm), R44 (10 M ohm), and R44, R46 (470 K ohm); capacitors C22, C25, C26 (0.1 microF), C23 C24, C28 (0.001 microF) and C27 (100 pF); op amps 601, 602 and 603; and IC604 (Part No. 4538).

The circuitry that inhibits pulse transformers T2 and T3 during a soft charge or crowbar condition includes an opto-coupler Q13, and associated circuitry. Switch Q13 conducts during either a soft charge or crowbar condition and causes controller 109 to inhibit the transformer pulses, thus preventing SCR's QA and QB) from turning on, and preventing power from being provided to transformer T1 (FIGS. 2 and 3). With no power pulses through transformer T1, bypass SCR Q1 (FIG. 2) will not come on.

The associated circuitry that works with switch Q13 includes a pair of 45 K ohm resistors R50 and R51, a 47 microF capacitor C30, a zener diode Z5, a 10 K ohm resistor R52, a 0.1 microF capacitor C31 and an op amp 606.

Figure 7:
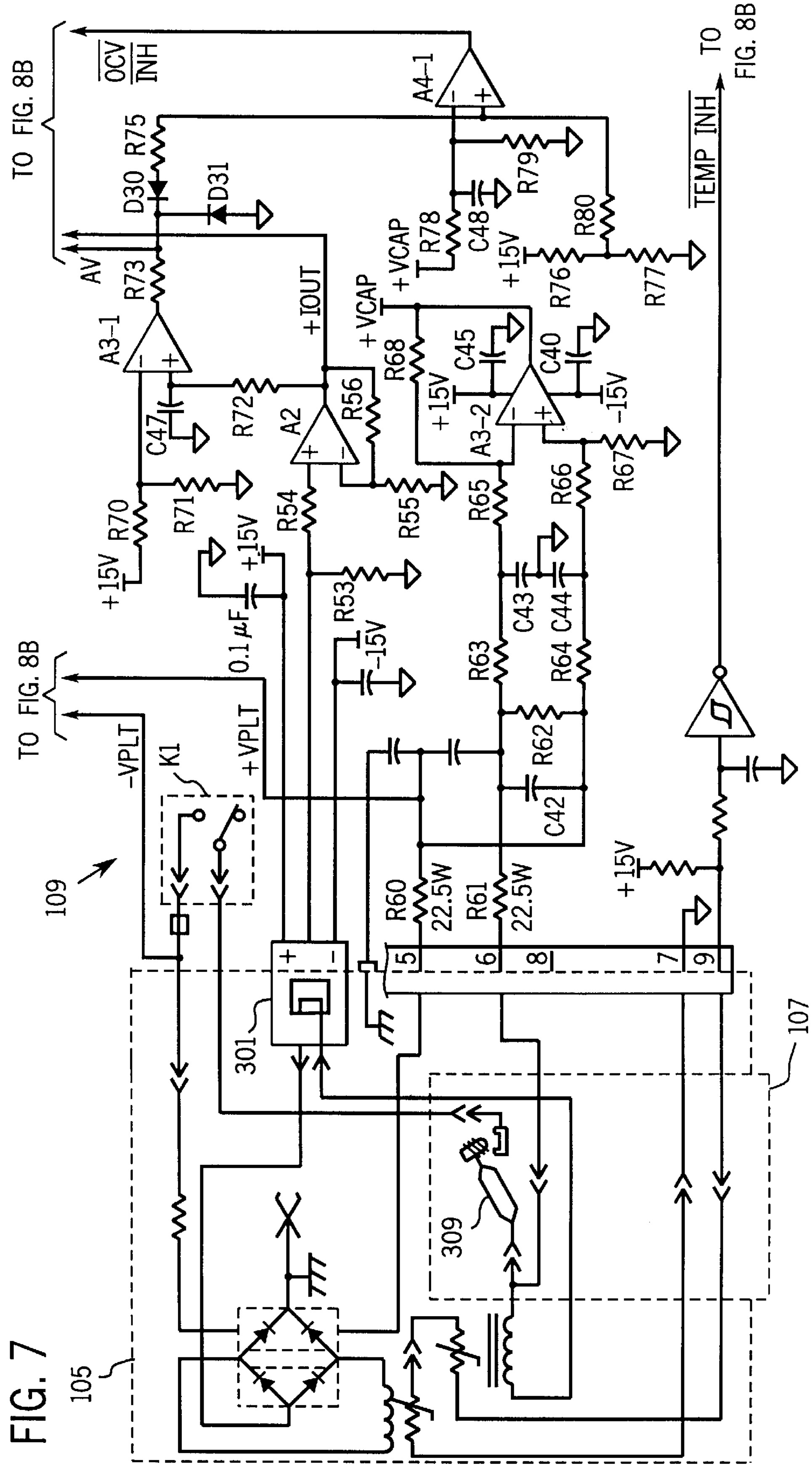
FIG. 7 is a schematic diagram of part of the controller of FIG. 1.

Referring now to FIG. 7, the current feedback circuit is shown in more detail. Hall effect device 301 provides a signal derived from the actual current. The current signal is amplified by op amp A2, and provided to other circuitry in controller 109. A plurality of resistors R53–R56 control the amplification of op amp A2, and have values chosen accordingly. Because the current in electrode 309 is sensed by Hall device 307, the single feedback circuit monitors both pilot and cutting current.

An op amp A3 is used to provide a voltage feedback signal. The inputs of op amp A3 are connected to the workpiece and electrode. Op amp A3 is configured as a difference amplifier, and thus provides a signal indicative of the output voltage. The voltage feedback circuitry includes resistors R60, R61, R62, R63, R64, R65, R66, R67 and R68, and capacitors C40, C41, C42, C43, C44, C45 and C46. The values may be chosen to obtain the appropriate gain and stability.

Also shown schematically on FIG. 7 is an arc (or current) verification circuit, including an op amp A3, configured as a comparator. Op amp A3 receives as one input the output of op amp A2, which is the current magnitude signal. The other input of op amp A3 is connected to a reference signal, having a magnitude determined by the associated circuitry. Thus, when the current magnitude exceeds a predetermined level a positive signal is generated by op amp A3, indicating the arc is present. The circuitry associated with op amp A3 includes resistors R70, R71, R72, R73, and capacitor C45. These components are chosen to provide a desired current threshold.

According to one embodiment of this invention a redundant safety feature, not present in the prior art, is provided. Generally, when controller 109 senses that there is no current in electrode 309 it causes the transformer pulses to be inhibited. Thus, the output voltage is relatively low, not as likely to cause injury.

One example of circuitry which implements this feature is shown schematically on FIG. 7. The output of op amp A3 (which indicates the presence or absence of an arc) is provided as one input to an op amp A4 (through a 22 K ohm resistor R75 and a pair of diodes D30 and D31. Op amp A4 is configured as a comparator and also receives the voltage feedback signal (from op amp A3) through a 121 K ohm resistor R79, a 150 K ohm resistor R79 and a capacitor C48, shifted by the +15 V bus through a combination of resistors R76 (56.2 K ohm) and R77 (30.1 K ohm) and through a 220 K ohm resistor R78. When no current is present op amp A4 causes controller 109 to inhibit transformer pulses. Thus, a redundant safety system is established.

As has been done in the prior art, the output current may be close loop controlled. One such control is shown schematically on FIG. 8, and includes an op amp A7. Op amp A7 receives the selected current level (either pilot or cutting) from the front panel. The resistors R81–R83, capacitors C50 and C51, through which the current set point is provided, may be selected to provide a desired gain. The output of op amp A7 is summed with the actual output current feedback signal from op amp A2 of FIG. 7 (+IOUT) by an op amp A8. A plurality of resistors R84–R86, R86A are selected to provide a desired gain and stability. The output of op amp A8 is provided to an op amp A9, which provides an enable signal whenever the set (or user selected) current level is higher than actual current level. The output of op amp A9 is provided to op amp 601 (FIG. 6) which removes the pulse inhibit signal when the enable signal is on. Thus, controller 109, unless inhibited by other supervisory circuitry, will generate a trigger pulse.

Figure 8A:
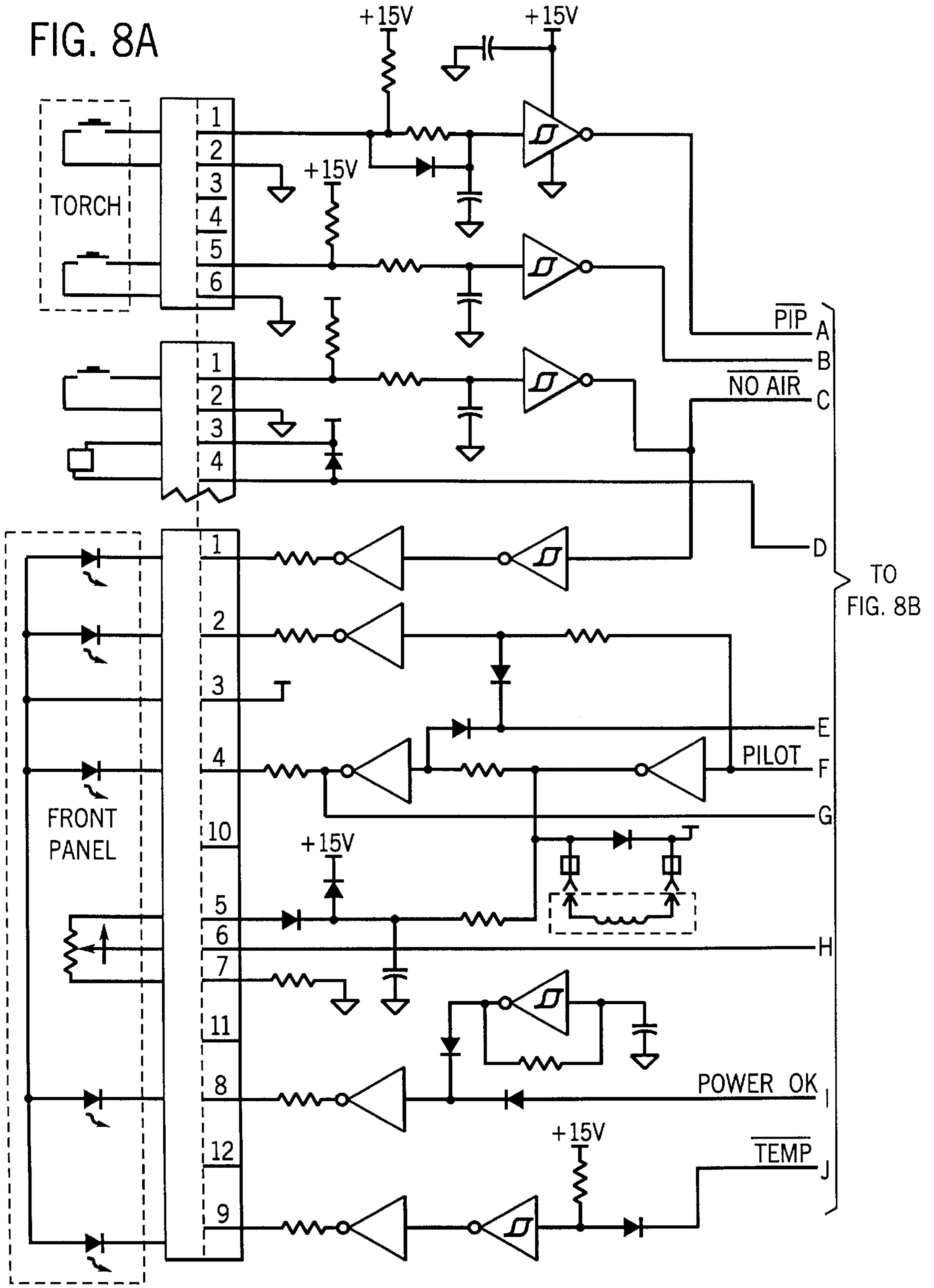
FIG. 8 is a schematic diagram of part of the controller of FIG. 1.
Figure 8B:
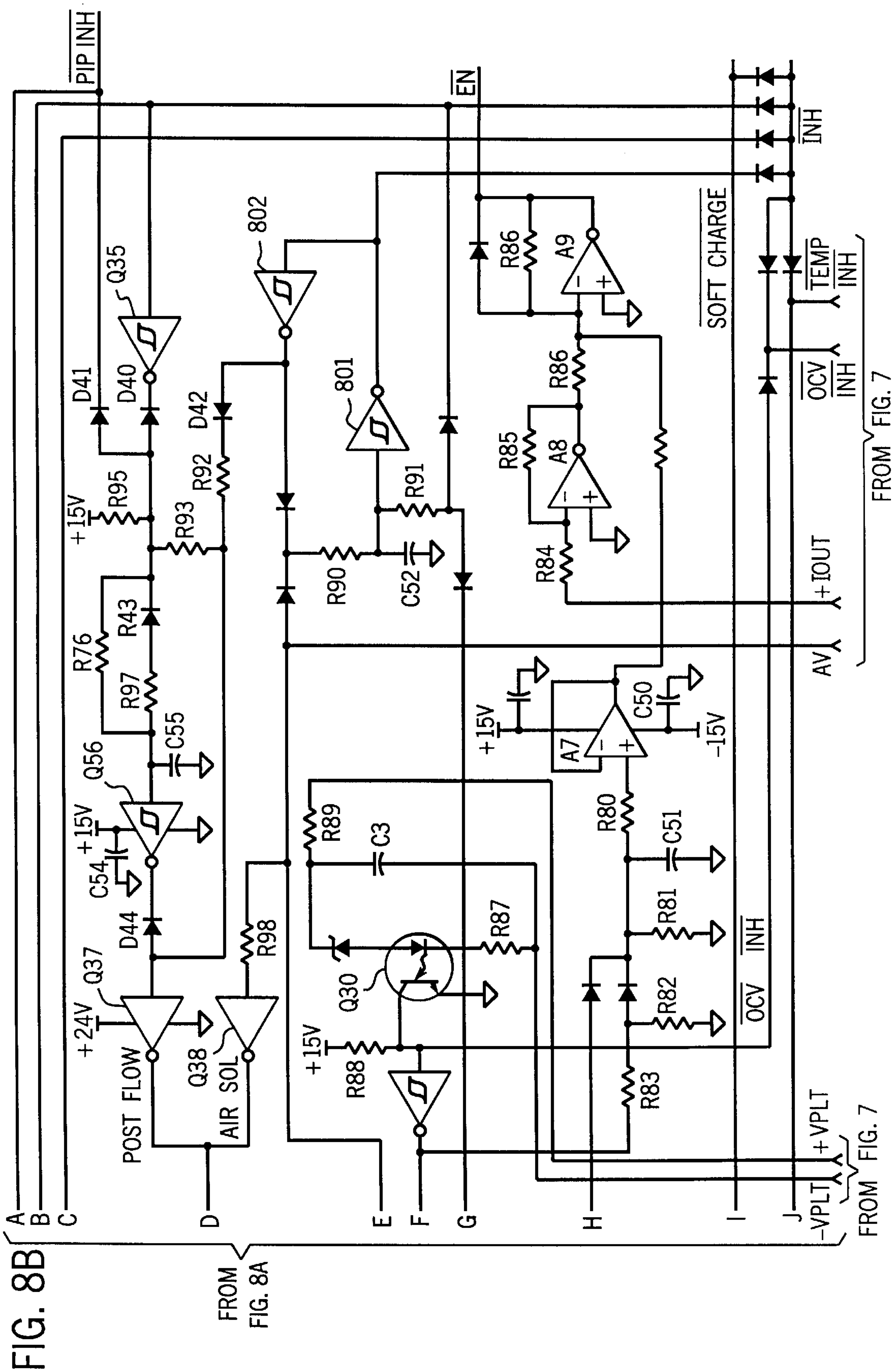

Also shown on FIG. 8 is circuitry that determines when the current has transferred from the pilot current path to the cutting current path. An opto-coupler Q30 monitors the current level in the pilot path. The current value is deduced from voltage developed in pilot resistor R5 (FIG. 3). When current is flowing in the pilot path, opto-coupler Q30 is on. However, when the current through resistor R5 drops below a predetermined value, Q4 changes state, indicating current has transferred. Values for associated resistors R87–R89 and capacitor C51 may be selected by the designer. Relay K1 (FIGS. 2 and 7) is opened after the current has transferred.

A pilot timer circuit limits the time the operator can have pilot current in the torch without transferring to cutting as a way to extend part life. This circuit is shown in FIG. 8 and includes IC's 801 and 802 (Part Nos. 40106) and associated discrete components (resistors R91–R93 and capacitor C53). The circuit is reset when the user releases the trigger switch and starts timing when the presence of the arc is verified. After a predetermined time lapse, if there has been no transfer to cutting, a pilot timer latches and asserts a pulse inhibit and holds air solenoid 307 engaged. With no pilot current the torch cools. The pilot current may be restarted by recycling the trigger switch.

Finally, the circuitry which provides for the inventive postflow feature is also shown on FIG. 8. The circuit is comprised of Q35, Q36, Q37 and Q38, and their associated discrete components, resistors R95 (4.7 K ohm); R96 (1 M ohm); R97 (4.7 K ohm) and R98 (10 K ohm); capacitors C54 (0.1 microF); C55 (10 microF); and diodes D40–D44. When the plasma cutting system is initially powered up, and the trigger switch is open, a postflow cycle starts, thus purging hose 303 and torch 306. Also, when the trigger switch is open at the end of cutting, a postflow cycle starts to cool components. The postflow cycle is terminated if the trigger switch is activated. Additionally, a PIP switch terminates the postflow cycle, thus preventing air from flowing when consumable parts are being removed.

Figure 9:
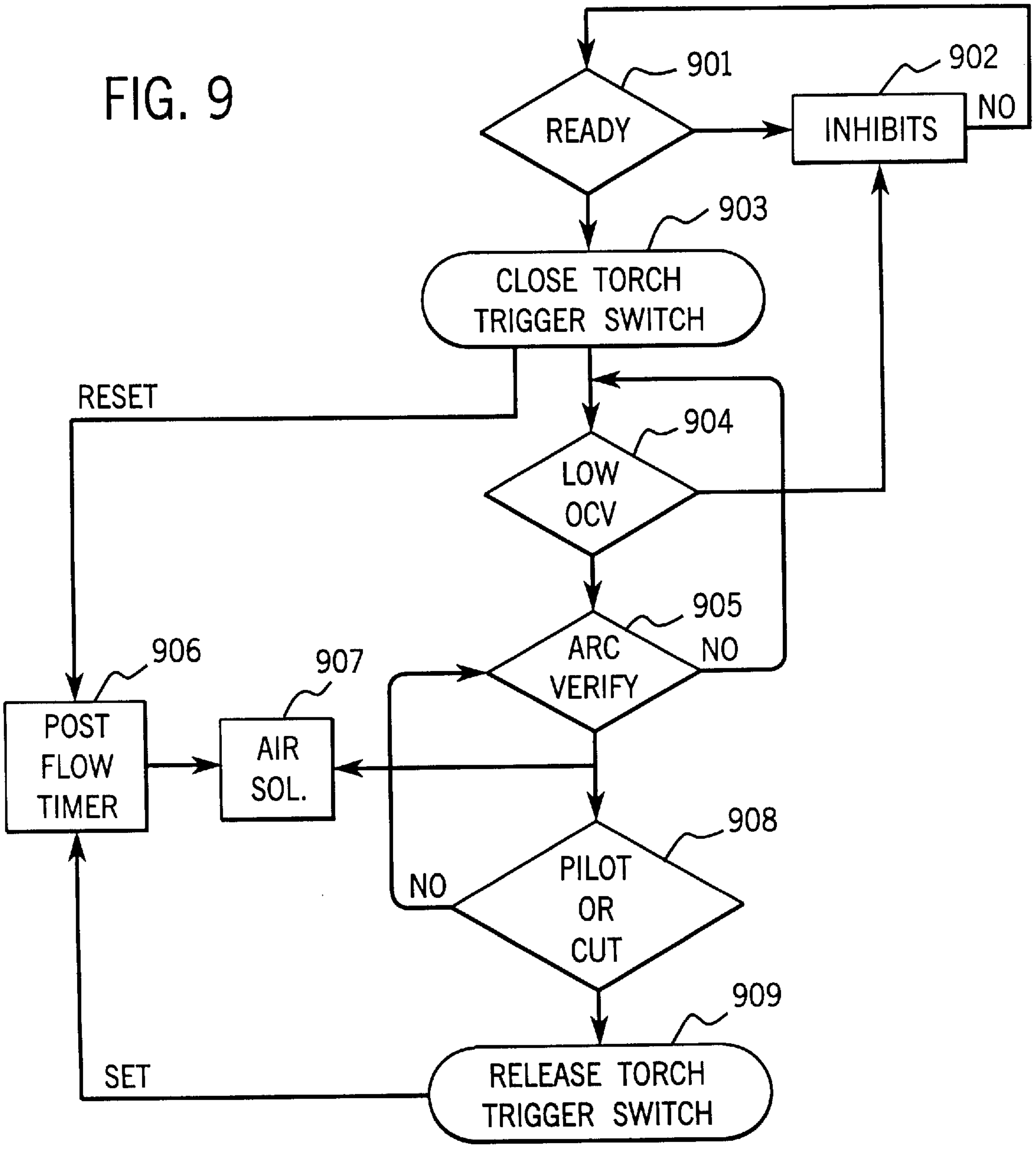
FIG. 9 is a flow diagram illustrating the invention.

The features of the present invention may be implemented in any number of ways, and the block diagrams and circuitry shown in FIGS. 1–8 are not intended to be limiting. FIG. 9 is a flow chart illustrating this invention. The LOW OCV, ARC VERIFY and PILOT or cut features are shown. Also, the inhibit and postflow features are shown as well.

Thus, it should be apparent that there has been provided in accordance with the present invention a method and apparatus for a contact start plasma cutting process that fully satisfies the objectives and advantages set forth above. Although the invention has been described in conjunction with specific embodiments thereof, it is evident that many alternatives, modifications, and variations will be apparent to those skilled in the art. Accordingly, it is intended to embrace all such alternatives, modifications, and variations that fall within the spirit and broad scope of the appended claims.

The embodiments of the invention in which an exclusive property or privilege is claimed are defined as follows:

1. A system for plasma cutting comprised of:

a power supply having a first power output and a second power output;

a cutting torch electrically connected to the first power output and the second power output, and having an air input and a nozzle;

a source of air connected to the air input; and a valve, connected between the nozzle and the air supply, wherein the valve has an air flow position that allows air to flow from the air source to the nozzle, and wherein the valve has a vent position that prevents air from flowing from the air supply to the nozzle and wherein when the valve is in the vent position the torch, including the nozzle, is vented to the ambient air.

2. The apparatus of claim 1 wherein:

the torch includes a movable electrode and a nozzle in a fixed position;

the torch has an air flow channel defined therein;

the electrode is electrically connected to the first power output;

the nozzle is electrically connected to the second power output;

the electrode is biased to be in contact with the nozzle; and the electrode is in the air flow channel, wherein air flow into the torch causes the bias to be overcome, and moves the electrode away from the nozzle.

3. The apparatus of claim 2 wherein the torch includes a trigger switch having an on position indicating that output current is desired, and an off position indicating that output current is not desired, and wherein the power source includes:

means for sensing the absence of an arc;

means for moving the valve to the vent position in the event the arc is absent; and means for maintaining a pilot current in the event the trigger switch is in the on position and the arc is absent.

4. The apparatus of claim 3 wherein the power supply includes means for detecting the absence of current flowing in the electrode, and means for providing a reduced output voltage in the event the absence of output current is detected.

5. The apparatus of claim 4 wherein the power supply includes means for maintaining the valve in the air flow position when the trigger switch is moved from the on position to the off position.

6. The apparatus of claim 3 wherein the power supply includes means for maintaining the valve in the air flow position when the trigger switch is moved from the on position to the off position.

7. The apparatus of claim 4 wherein the power supply includes means for moving the valve to the air flow position when the power supply is powered up.

8. The apparatus of claim 3 wherein the power supply includes means for moving the valve to the air flow position when the power supply is powered up.

9. A plasma cutting torch comprised of:

a movable electrode connected to a first power output;

a nozzle in a fixed position and connected to a second power output;

a spring connected to the electrode that biases the electrode to be in contact with the nozzle;

an air input, wherein air flow into the torch causes the bias to be overcome, and moves the electrode away from the nozzle; and a valve, connected between the nozzle and the air input, wherein the valve has an air flow position that allows air to flow into the nozzle, and wherein the valve has a vent position that prevents air from flowing into the nozzle, and wherein when the valve is in the vent position the torch, including the nozzle, is vented to the ambient air.

10. A system for plasma cutting comprised of:

a power supply having a first power output and a second power output; and a cutting torch electrically connected to the first power output and the second power output, and having an air input and a nozzle;

wherein the power supply includes means for detecting the absence of current flowing in the electrode, and means for providing a reduced output voltage in the event the absence of output current is detected.

* * * * *